United States Patent [19]

Ozeki et al.

[11] Patent Number: 4,792,352

[45] Date of Patent: Dec. 20, 1988

[54] METHOD FOR MANUFACTURING STEEL THROUGH SMELTING REDUCTION

[75] Inventors: Akichika Ozeki; Kenzo Yamada; Katsuhiro Iwasaki, all of Tokyo, Japan

[73] Assignee: Nippon Kokan Kabushiki Kaisha, Tokyo, Japan

[21] Appl. No.: 45,624

[22] Filed: May 1, 1987

[51] Int. Cl.$^4$ .............................................. C21C 7/00
[52] U.S. Cl. ................................. 75/59.22; 75/59.19
[58] Field of Search ........................... 75/59.19, 59.22

[56] References Cited

U.S. PATENT DOCUMENTS

| | | | |
|---|---|---|---|
| 3,252,790 | 11/1960 | Krivsky | 75/60 |
| 3,773,496 | 11/1973 | Knuppel et al. | 75/60 |
| 3,844,768 | 10/1974 | Leroy et al. | 75/59 |
| 3,854,932 | 12/1974 | Bishop, Jr. | 75/49 |
| 4,178,173 | 12/1979 | Gorges et al. | 75/60 |
| 4,316,739 | 2/1982 | Beggs et al. | 75/40 |
| 4,399,983 | 8/1983 | Metz | 266/176 |
| 4,497,656 | 2/1985 | Robert | 75/59.19 |

FOREIGN PATENT DOCUMENTS

| | | |
|---|---|---|
| 0036382 | 9/1981 | European Pat. Off. . |
| 0079182 | 5/1983 | European Pat. Off. . |
| 0094707 | 11/1983 | European Pat. Off. . |
| 0122239 | 10/1984 | European Pat. Off. . |

Primary Examiner—Peter D. Rosenburg
Attorney, Agent, or Firm—Frishauf, Holtz, Goodman & Woodward

[57] ABSTRACT

A method for manufacturing molten steel wherein iron ore and coal are continuously supplied onto molten metal containing carbon of 1% or less while blowing oxygen gas is being introduced onto the molten metal through a lance. Simultaneously with this operation, stirring gas is being introduced into the molten metal at a rate of 0.05 to 0.5 Nm$^3$/min/ton of molten metal through a tuyere. The slag and the molten steel produced, is continuously or periodically discharged.

17 Claims, 3 Drawing Sheets

METHOD FOR MANUFACTURING STEEL THROUGH SMELTING REDUCTION

BACKGROUND OF THE INVENTION

1. Field of the Invention

The present invention relates to a method for manufacturing steel through smelting reduction, and more particularly to a method wherein iron ore and coal are charged, and oxygen gas is blown in, onto molten metal.

2. Description of the Prior Arts

Recently, methods for smelting and reducing iron ore directly, as steel manufacturing method, without use of a blast furnace, have been proposed and developed, in stead of conventional iron-and-steel making, wherein a blast furnace and a converter have been used.

Japanese Patent Laid Open (KOKAI) No. 16611/81, filed by Midrex Corporation in United States, for example, describes a method, wherein:

(a) oxide iron in powder is reduced, through contact with heated reducing gas, to iron metal in solid particle;

(b) fossil fuel and oxygen gas are injected into a chamber wherein molten iron bath is already contained, and thereby, the molten iron is smelted and the fossil fuel is gasified. The gasification generates heated off-gas from the fossil fuel in the chamber; and (c) the heated off-gas, being cooled and humidified, is turned into the heated reducing gas.

This method, however, includes a process of producing reduced iron. This raises an expense for investment in equipment so high that this method is too hard to commercialize at present.

Another method has been proposed, wherein:

(a) molten iron is produced without use of a pre-reduction furnace; and (b) iron ore is charged onto the molten iron bath, and the molten iron is reduced to molten steel.

In this method, the molten iron bath is of low reduction potential, since carbon content in the molten iron bath is 1% or less. Accordingly, iron ore, which is charged onto the molten iron bath, is hard to smoothly reduce, although the iron ore is smelted. So, this method is disadvantageous in that not only furnace productivity is low but also inwall refractories are intensively eroded. That is not economical.

SUMMARY OF THE INVENTION

An object of the present invention is to provide a method for manufacturing steel wherein steel can be produced directly from iron ore by means of reducing the iron ore in high efficiency.

According to the present invention, a method is provided for manufacturing steel through smelting reduction which comprises the steps of;

preparing molten metal containing carbon of 0.05 to 1.0% in a converter-type reaction vessel;

charging continuously iron ore and coal onto the molten metal while stirring gas, at a rate of 0.05 to 1.0 Nm$^3$/min/T where T represents one ton of molten metal, and oxygen gas are being blown onto the molten metal, thereby to reduce the iron ore; and discharging slag and molten steel both produced.

Other objects and advantages of the present invention will become apparent from the detail description to follow taken in conjunction with the appended drawings.

DESCRIPTION OF THE PREFERRED EMBODIMENT

Figure 1:
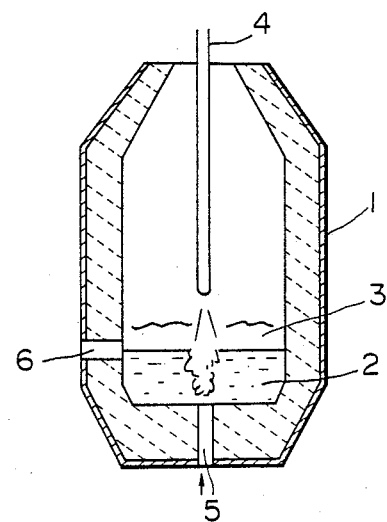
FIG. 1 is a schematic view showing an apparatus used for a method according to the present invention.

Turning now more specifically to the drawings, FIG. 1 schematically illustrates an apparatus used for a method for manufacturing steel according to the present invention. In FIG. 1, reference numerals denote, respectively, top-and-bottom-blow-converter-type reaction vessel 1; molten metal 2 contained in reaction vessel 1; slag 3 floating on molten metal 2; lance 4 blowing high pressure oxygen gas into molten metal 2 in reaction vessel 1; bottom tuyere 5 blowing stirring gas into molten metal 2; and tapping hole 6 discharging molten steel.

Firstly, molten iron tapped out of a blast furnace is charged into reaction vessel 1. The molten iron is decarbonized by blowing oxygen gas through lance 4 to prepare molten metal 2 containing carbon content of 1% or less, since the molten iron, as mother molten iron, is of high carbon content of approximatley 4%. Following this step, oxygen gas is blown onto the molten metal through lance 4. And, simultaneously with the oxygen gas blow-in, iron ore is continuously charged together with coal necessary in amount to smelt and reduce the iron ore and with flux for control of slag basicity. Further, simultaneously with this charging, stirring gas is blown into the molten metal through the bottom tuyere 5, and oxygen gas is blown onto the molten metal through lance 4. Molten steel and slag both produced by blowing the oxygen gas are continuously discharged through tapping hole 6.

In this embodiment, molten iron is used for mother molten metal. When, however, the carbon content of the mother molten metal is 1% or less, there is no need for decarbonization of the mother molten metal. In this case, iron ore and flux are charged onto the molten metal, oxygen gas and stirring gas being blown onto the molten metal.

As iron bearing material, iron ore, reduced iron and scrap are used. As flux, limestone and dolomite are available. As stirring gas, argon, nitrogen, oxygen and process gas generated from reaction vessel 1 can be used.

It is preferable that discharge of molten metal product and slag product is carried out continuously and periodically so as to keep a certain distance between the end of lance 4 and the surface level of the molten metal. Otherwise, the state of oxygen gas blown in through lance 4 is disadvangageously changed because the surface level of the molten metal is raised due to smelting reduction of the iron ore, which is continuously charged into reaction vessel 1.

The reason that the carbon content of molten metal 2 is required to be 1% or less for charging iron ore and coal will now be described with reference to the drawings.

Figure 2:
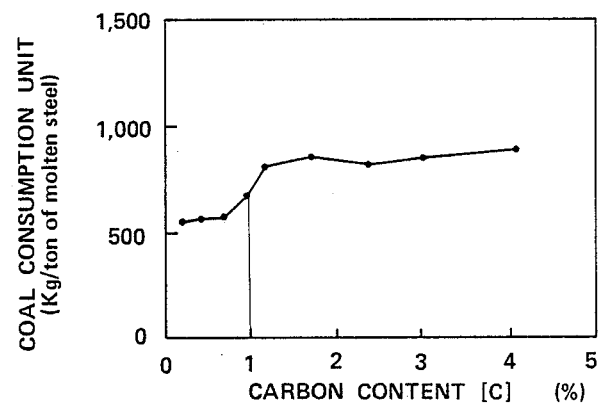
FIG. 2 is a graphic representation showing relationship between carbon content in molten iron and coal unit consumption of the present invention.
Figure 3:
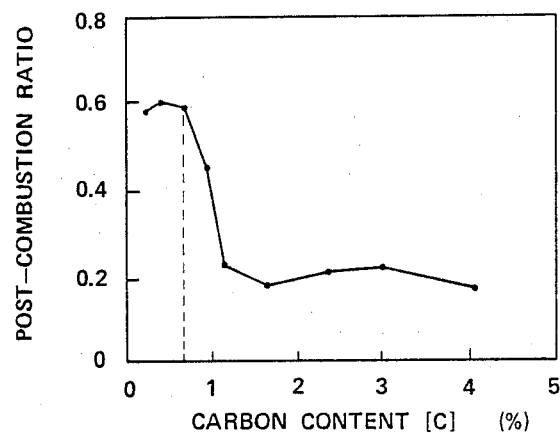
FIG. 3 is a graphic representation showing relationship between carbon content in molten iron and post-combustion ratio of the present invention.

A test result of an operation according to the present invention shows changes of coal unit consumption in relation to carbon content in molten metal in FIG. 2. The coal unit consumption is reduced when the carbon content is 1% or less. If the carbon content becomes 0.7% or less, the reduction of the coal unit consumption is more preferably improved. This is apparently recognized from FIG. 3 wherein chanees of post-combustion ratio to the carbon content in molten metal 2 are represented when bottom blow nitrogen gas amounts to 0.2 Nm³/min/ton of molten metal to smelt and reduce iron ore.

The post combustion ratio is given, as a ratio of gas constituent discharged from reaction vessel 1, by the following formula:

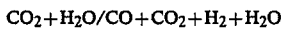

$$CO_2 + H_2O / CO + CO_2 + H_2 + H_2O$$

In the case of the post-combustion represented by the following:

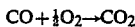

$$CO + \tfrac{1}{2}O_2 \rightarrow CO_2$$

the post-combustion ratio does not increase when the carbon content in the molten metal is so large that $CO_2$ reacts with C contained in the molten metal to form CO. Consequently, coal consumption is increased. If the carbon content in the molten metal is 1% or less, the post-combustion ratio is improved and the post-combusted heat is efficiently used. This reduces coal unit consumption. If the carbon content is 0.7% or less, the post-combustion ratio is more preferably improved.

The carbon content in molten metal 2 can be controlled to be kept a desired level by changing the ratio of oxygen to coal, both being continuously supplied to molten metal 2. Increase of the carbon content in the molten metal is obtained by reducing the ratio representing by "amount of oxygen gas"/"amount of coal". And, decrease of the carbon content is obtained by raising the ratio. 0.05% or more of the carbon content in the molten metal is preferable. If the carbon content is decreased, oxidation of C becomes more than that of Fe and, FeO and $Fe_2O_3$ are increased in molten slag. This generates blowouts. In addition, yield of Fe is lowered as much more oxidation of Fe occurs.

With specific reference to FIG. 4 of the drawing, the necessity for stirring gas being blown in at a rate equal to or over 0.05 Nm³/min/ton of molten metal will now be described.

Figure 4:
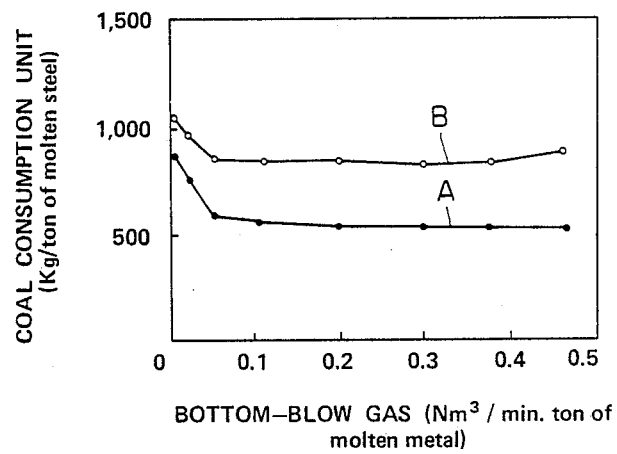
FIG. 4 is a graphic representation showing relationship between amount of bottom blow-in gas and coal unit consumption of the present invention.
Figure 5:
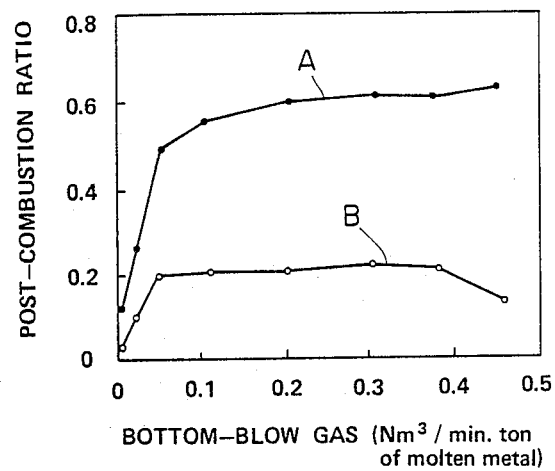
FIG. 5 is a graphic representation showing relationship between amount of bottom blow-in gas and post-combustion ratio of the present invention.

According to a test result of an operation, changes of coal unit consumption (kg/ton of steel) in relation to bottom-blow gas (Nm³/min, ton of molten metal) are shown in FIG. 4. In this operation the bottom-blow gas was nitrogen. Line A and line B, each, represent the changes when carbon content in molten metal is approximately 0.02% and 2%. When the amount of bottom-blow gas is 0.05 Nm³/ton of molten metal or more, the coal consumption unit can be reduced, regardless of amount of the carbon content in the molten metal. If the amount of the bottom-blow gas is 0.1 Nm³/ton of molten metal or more, the coal consumption unit is more preferably reduced. This is apparently recognized from FIG. 5, wherein changes of the post-combustion ratio in relation to the bottom-blow gas are represented when temperature of molten metal 2 in reaction vessel 1 amounts to 1600° C. Line A and line B, each, represent the changes when amount of the bottom-blow gas is approximately 0.2%, and 2%. The representation teaches that the post-combustion ratio increases when the amount of the bottom-blow gas is 0.05 Nm³/min/ton of molten metal or more. The increase of the post-combustion ratio in the case of 0.2% carbon content is remarkably higher than that in the case of 2% carbon content. When the carbon content is 0.2% and the amount of the bottom-blow gas is 0.1 Nm³/min/ton of molten metal or more, the post-combustion ratio is more preferably improved.

1.0 Nm³/min/ton of molten metal or less of amount of the bottom-blow gas is preferable. If the amount is over 1.0 Nm³/min/ton of molten metal, splash occurs owing to channeling of gas. This gives unfavourable conditions to the operation. In addition, to strengthen stirring effect, stirring gas can be blown in through tuyeres set in side-wall of reaction vessel 1 (not shown).

Charging amount of coal is recommended to be 500 to 800 kg/ton of molten steel. If the charging amount is less than 500 kg/ton of molten steel, temperature of the molten metal is lowered owing to insufficiency of heat value. If the charging amount is over 800 kg/ton, the temperature of the molten metal rises excessively owing to excess of heat value.

Charging amount of iron ore is also recommended to be 1400 to 1500 kg/ton of molten steel. 450 to 500 Nm³/min/ton of molten steel of amount of blow-in oxygen is preferable.

EXAMPLE

Figure 6:
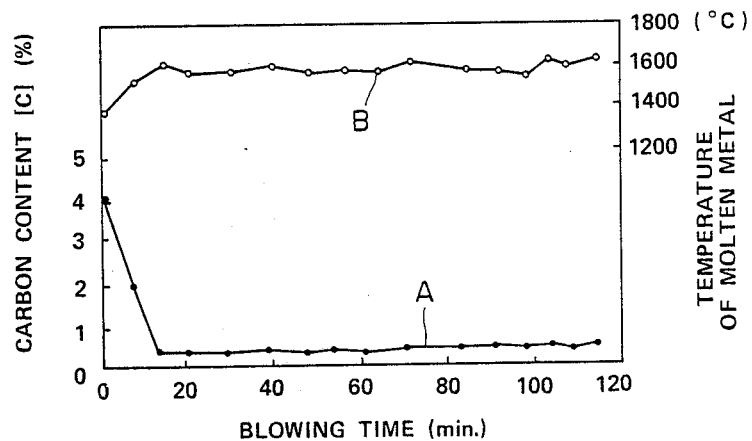
FIG. 6 is a graphic representation showing the results of an operation according to the present invention.

According to a test result of an operation, changes of amount of the carbon content in the molten metal in relation to blowing time are shown in FIG. 6. In this operation, iron ore is decarbonized, and subsequently smelted and reduced according to the present invention, when the carbon content in mother molten metal is 4%.

At initial stage of blowing, iron ore was supplied onto molten metal 2 without supply of coal, while oxygen gas was being blown thereonto. Molten metal 2 was decarbonized by the oxygen gas. The amount of the carbon content in the molten metal was gradually reduced and the temperature of the molten metal increased.

When the carbon content in the molten metal was decreased to 0.5%, iron ore was smelted and reduced by supplying continuously oxygen gas and coal onto the molten metal, the 0.5% carbon being kept.

The operation conditions are as follows:
Charging amount of iron ore: 1,450 kg/ton of molten steel
Charging amount of coal: 600 kg/ton of molten steel
Blowing amount of oxygen: 480 Nm³/min/ton of molten steel
Bottom-blow amount of gas: 0.3 Nm³/min/ton of molten metal The temperature of the molten metal was kept to be almost 1600° C. throughout the smelting reduction.

Iron ore was successfully melted and reduced. Carbon content in discharging molten steel was approximately 0.5%.

The present invention, as described in the above, charges iron ore into a top-and-bottom-blow converter, in the state wherein carbon content of mother molten metal is 1% or less and bottom-blow gas is blown onto the molten metal at an rate of 0.05 Nm³/min/ton molten metal or more and the temperature of the molten metal being kept a constant level, thereby to improve the post-combustion ratio. This can remarkably reduce coal unit consumption (kg/ton of steel). Consequently, the present invention enables steel to efficiently be produced directly from iron ore. Moreover, the present invention can reduce damage of furnace inwall since the temperature of the molten metal is kept a constant level.

What is claimed is:

1. A method for manufacturing steel through smelting reduction which comprises the steps of:
   providing molten metal comprising iron containing 0.05 to 1.0% carbon in a converter-type reaction vessel;
   charging continuously iron ore and coal onto the molten metal while (i) stirring gas, a a rate of 0.05 to 1.0 Nm³/min/T where T represents one ton of molten metal, and (ii) oxygen gas, are being blown onto the molten metal to reduce the iron ore; and
   discharging slag product and molten steel product.

2. The method according to claim 1, wherein said step of providing molten iron includes blowing oxygen gas onto molten iron to decarburize the molten iron to the carbon content of 0.5 to 1%.

3. The method according to claim 2, wherein said molten iron is decarburized to a carbon content of 0.05 to 0.7%.

4. The method according to claim 1, wherein said step of blowing stirring gas includes blowing said stirring gas through a tuyere set at the bottom of the reaction vessel.

5. The method according to claim 1, wherein said stirring gas is at least one selected from the group consisting of argon, nitrogen, oxygen and process gas generated from the reaction vessel.

6. The method according to claim 1, wherein said step of blowing stirring gas includes blowing the stirring gas at a rate of 0.1 to 1.0 Nm³/min /T.

7. The method according to claim 1, wherein said step of discharging includes discharging continuously the slag product and the molten metal product.

8. The method according to claim 1, wherein said step of discharging includes discharging periodically the slag and the molten metal both produced.

9. The method according to claim 1, wherein the molten steel has a carbon content of 1% or less.

10. The method according to claim 1, wherein said step of charging coal includes charging the coal at a rate of 500 to 800 kg/ton of molten steel.

11. The method accoridng to claim 1, wherein said step of charging iron ore includes charging iron ore at a rate of 1,400 to 1,500 kg/ton of molten steel.

12. The method according to claim 1, wherein said step of blowing oxygen gas includes blowing the oxygen gas at a rate of 450 to 500 Nm³/min/ton of molten steel.

13. A method of manufacturing steel through smelting reduction which comprises the steps of:
    providing molten iron containing 0.05 to 0.7% carbon in a converter-type reaction vessel;
    charging continuously iron ore and coal onto the molten iron, while (i) stirring gas, at a rate of 0.1 to 1.0 Nm³/min./ton and (ii) oxygen gas for blowing, are blown in, to reduce the iron ore; and
    discharging slag product and molten steel product having a carbon content of 1% or less.

14. The method according to claim 13, wherein said stirring gas is blown through at least 1 tuyere into the molten metal; and the oxygen gas is blown through a downwardly projecting lance positioned in the converter.

15. The method according to claim 14, wherein
    said step of charging coal includes charging the coal at a rate of 500 to 800 kg/ton of molten steel;
    said step of charging iron ore includes charging iron ore at a rate of 1,400 to 1,500 kg/ton of molten steel; and
    said step of blowing oxygen gas includes blowing the oxygen gas at a rate of 450 to 500 Nm³/min/ton of molten steel.

16. The method according to claim 13, wherein
    said step of charging coal includes charging the coal at a rate of 500 to 800 kg/ton of molten steel;
    said step of charging iron ore includes charging iron ore at a rate of 1,400 to 1,500 kg/ton of molten steel; and
    said step of blowing oxygen gas includes blowing the oxygen gas at a rate of 450 to 500 Nm³/min/ton of molten steel.

17. The method accordingly to claim 15, wherein said stirring gas is at least one selected from the group consisting of argon, nitrogen, oxygen and process gas generated from the reaction vessel.

* * * * *